United States Patent
Chia et al.

(10) Patent No.: US 11,105,142 B2
(45) Date of Patent: Aug. 31, 2021

(54) DOOR OPERATING SYSTEM

(71) Applicant: Continental Automotive GmbH, Hannover (DE)

(72) Inventors: Kah Heng Chia, Singapore (SG); Boon Chen Low, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 165 days.

(21) Appl. No.: 16/095,580

(22) PCT Filed: May 18, 2016

(86) PCT No.: PCT/IB2016/052887
§ 371 (c)(1),
(2) Date: Oct. 22, 2018

(87) PCT Pub. No.: WO2017/199065
PCT Pub. Date: Nov. 23, 2017

(65) Prior Publication Data
US 2019/0085614 A1 Mar. 21, 2019

(51) Int. Cl.
*E05F 15/77* (2015.01)
*G07F 17/10* (2006.01)
(Continued)

(52) U.S. Cl.
CPC .............. *E05F 15/77* (2015.01); *B60R 25/24* (2013.01); *E05F 15/73* (2015.01);
(Continued)

(58) Field of Classification Search
CPC ......... E05F 15/77; E05F 15/73; H04W 4/029; H04W 4/40; B60R 25/24;
(Continued)

(56) References Cited

U.S. PATENT DOCUMENTS 9,875,589 B1 * 1/2018 Buttolo .............. G07C 9/00174
2007/0069854 A1 * 3/2007 Kamiya ................ B60R 25/403
340/5.72
(Continued)

FOREIGN PATENT DOCUMENTS

DE 102012107284 2/2014
JP 2009013741 * 1/2009
(Continued)

OTHER PUBLICATIONS

International Preliminary Report on Patentability for Application No. PCT/IB2016/052887, dated Sep. 5, 2018, 7 pages.
(Continued)

*Primary Examiner* — Mike Anderson
*Assistant Examiner* — Matthew Cobb
(74) *Attorney, Agent, or Firm* — RatnerPrestia

(57) ABSTRACT

A door operating system for automatic opening of a door of a vehicle boot is provided. The door operating system includes an on-board device mountable on the vehicle and a mobile device. The on-board device includes a door opening mechanism, a boot door control module for activating the door opening mechanism, a door opening sensor, the door opening sensor being configured to receive a door opening signal for bringing the boot door control module into an automatic opening mode, and a presence sensor. The presence sensor is configured to detect a presence signal from a wireless vehicle access device. The mobile device includes a transmitter for sending the door opening signal to the door opening sensor, a transaction module for cashless purchasing of goods and for providing transaction data indicative of at least one physical parameter of the purchased goods, and a processor.

20 Claims, 2 Drawing Sheets

(51) Int. Cl.
*G06Q 20/32* (2012.01)
*E05F 15/73* (2015.01)
*H04W 4/029* (2018.01)
*H04W 4/40* (2018.01)
*B60R 25/24* (2013.01)
*G06Q 20/34* (2012.01)
*H04M 1/72415* (2021.01)

(52) U.S. Cl.
CPC .......... *G06Q 20/3278* (2013.01); *G06Q 20/34* (2013.01); *G07F 17/10* (2013.01); *H04W 4/029* (2018.02); *H04W 4/40* (2018.02); *B60R 2325/205* (2013.01); *E05Y 2900/548* (2013.01); *H04M 1/72415* (2021.01)

(58) Field of Classification Search
CPC .......... B60R 2325/205; G06Q 20/3278; G06Q 20/34; G07F 17/10; E05Y 2900/548; H04M 1/72533; G06C 20/34
USPC ...................................................... 705/3–44
See application file for complete search history.

(56) References Cited

U.S. PATENT DOCUMENTS

| | | | | |
|---|---|---|---|---|
| 2007/0203618 A1* | 8/2007 | McBride | ................. | B60R 25/24 701/2 |
| 2010/0280956 A1* | 11/2010 | Chutorash | ............. | G06Q 20/20 705/64 |
| 2013/0029685 A1* | 1/2013 | Moshfeghi | ........... | G06Q 20/409 455/456.1 |
| 2013/0169408 A1* | 7/2013 | Endo | ....................... | B60R 25/01 340/5.6 |
| 2014/0022052 A1* | 1/2014 | Lim | ....................... | G08C 17/02 340/5.61 |
| 2016/0099927 A1* | 4/2016 | Oz | .................... | H04W 12/0023 726/9 |
| 2017/0161820 A1* | 6/2017 | Friedman | ............. | G06Q 20/322 |
| 2017/0352124 A1* | 12/2017 | Semsey | .................. | B60R 25/24 |

FOREIGN PATENT DOCUMENTS

| | | |
|---|---|---|
| JP | 2009013741 A | 1/2009 |
| KR | 101588783 B1 | 1/2016 |
| WO | 2015062832 A1 | 5/2015 |

OTHER PUBLICATIONS

International Search Report and Written Opinion for International Application No. PCT/IB2016/052887, dated Feb. 8, 2017, 13 pages.
Extended European Search Report for European Application No. 16 902 285.2, dated Dec. 13, 2019, 9 pages.
Chinese Office Action for Chinese Application No. 201680085763. 8, dated Apr. 14, 2020, with translation, 15 pages.
Chinese Office Action for Chinese Application No. 201680085763. 8, dated Oct. 13, 2020, with translation. 16 pages.

* cited by examiner

DOOR OPERATING SYSTEM

CROSS REFERENCE TO RELATED APPLICATIONS

This application is the U.S. National Phase Application of PCT International Application No. PCT/IB2016/052887, filed May 18, 2016, the contents of such application being incorporated by reference herein.

FIELD OF THE INVENTION

The present application relates to an automatic door operating system. In particular, it relates to an automatic door operating system for a boot of a vehicle.

BACKGROUND OF THE INVENTION

In the prior art, automatic door operating systems for a vehicle boots are known, including automatic door operating systems based on so-called smart key technologies for hand-free automatic opening of the vehicle boots. In order open the vehicle boot, the driver or the user who is carrying a smart key, stands behind the vehicle for a pre-determined duration and the vehicle boot will then unlock and open automatically.

However, this solution tends to cause inconvenience for the driver, especially when he is carrying cumbersome items and needs to stow them in the vehicle boot immediately wherein he is required to wait for a pre-determined duration behind the vehicle near the vehicle boot. Besides, the boot of the vehicle may be opened unintentionally when the smart key holder is standing behind his vehicle near the vehicle boot without the intention to open the vehicle boot.

SUMMARY OF THE INVENTION

An aspect of this application aims to provide a novel automatic door operating system in order to improve the existing automatic door operating system and to make the automatic opening of the door of the vehicle boot more convenient for the user.

According to a first aspect of the present application, a mobile device is provided for automatic opening of a door of a vehicle boot. The mobile device comprises a transmitter for sending a door opening signal to a door opening sensor of a vehicle boot door control module of the vehicle for bringing the boot door control module into an automatic opening mode, a transaction module with a transceiver, being configured to send a user credit card identifier data for cashless purchasing of goods and for receiving corresponding transaction data with at least one physical parameter of the purchased goods. The mobile device further comprises a memory for storing the user credit card identifier data and the transaction data. The mobile device also comprises a processor which is configured to evaluate the transaction data and to activate the transmitter for sending the door opening signal if at least one door opening criterion based on the physical parameters of the purchased goods is fulfilled.

The vehicle boot door control module can be in particular a boot door control module configured as a remote keyless control module, which can activate a door opening mechanism if the user with a remote key is in a certain distance from the vehicle boot for a certain period of time.

The mobile device or smart device can be a hand-held device, in particular a smart hand-held device or a smart phone. The mobile device can also be a wearable mobile device. In particular, the mobile device can comprise wearable electronical components.

Both, hand-held or wearable mobile devices can be easily carried by the user of the mobile device, in particular by the driver of the vehicle.

The memory can be any kind of memory device which is suitable for storing the user credit card identifier data and the transaction data.

In particular, the memory can be a memory device which is configured for encrypted storage of the user credit card identifier data.

By encrypted storage of the user credit card identifier data the safety of the user credit card identifier data can be ensured.

By sending the door opening signal to the door opening sensor of the vehicle boot door control module if determined that the at least one door opening criterion is fulfilled, the door of the vehicle boot can be brought into the automatic opening mode, also referred as open-standby mode or standby mode below, for a swift opening of the door once the user is in the predefined distance from the boot. In this way, the user who is carrying the purchased goods does not need to search for the key or wait until the remote keyless control activates the door opening mechanism of the door of the vehicle boot. Instead, the user, in particular the driver of the vehicle, can seamlessly stow the purchased goods in the boot of the vehicle without suffering any inconvenience by waiting at the closed vehicle boot door.

The user also does not need to unlock and open the vehicle boot using mechanical key or press the remote control button on his keypad to access the vehicle boot.

Thus, the boot of the vehicle door opens automatically as the driver approaches the vehicle, if the evaluation of his purchase transaction history indicates that the user is carrying cumbersome goods.

Besides, using the mobile device makes unnecessary to generally reduce the automatic door opening time for the vehicles using the smart key technology, which would result in increase of the probability of unintentional door opening.

The transaction module can comprise an NFC (Near Field Communication) transceiver for making cashless purchasing with the mobile device.

Due to the NFC transceiver, the cashless payment can be carried out in a convenient way without using money in cash or physical credit card at points of sale (POS) which are equipped with terminals based on the NFC technology.

The transaction module can comprise an MST (Magnetic Secure Transmission) transceiver.

Due to the MST transceiver, the cashless payment can be carried out in a convenient way without using money in cash or physical credit card at points of sale (POS) which are equipped with terminals based on the MST technology.

The at least one physical parameter of the purchased goods can comprise length, width, height, weight, and/or quantity of the purchased goods.

This information can be used to analyze the amount and size of the purchased goods in order to determine whether the carrying of the purchased goods is cumbersome and hence the automatic door opening should be activated.

The transaction data can also comprise information on type of the transaction, in particular, whether the transaction was goods-related or a service-related transaction.

By distinguishing these two types of transaction, the service-related transactions can be excluded from taking into account. By excluding the service-related transactions from taking into account, the determination of the door opening criterion can be facilitated and the probability of erroneous determination can be reduced.

The door opening criterion can be a criterion which is fulfilled if a predefined limit in size, in weight, or in quantity of the purchased goods is exceeded.

When one of these limits is exceeded, the mobile device can send the door opening signal to the door opening sensor of a vehicle boot door control module. Thus, the boot door control module can be brought into the standby mode for swift opening of the boot door once the user is in the predefined distance from the boot.

The mobile device can comprise a location module for providing location data and the processer can be configured to process the location data for tracking the geographical location of the mobile device.

In the case when the information about the type of transaction is not available, the geographical location can indicate whether a specific transaction was a goods- or service-related transaction by taking into account the known points of sale (POS) at the location where the specific transaction has taken place.

The tracking of the location can be also used to determine whether the user has left the vehicle and/or whether the user is back in a predefined distance from the boot of the vehicle.

The location module can be a GPS (Global Positioning System) module for tracking the geographical location of the mobile device based on the GPS-data.

By implementing a GPS module in the mobile device, the geographical location of the mobile device can be easily tracked based on the GPS data and on available navigational maps.

According to another aspect of the application, a door operating system for automatic opening of a door of a boot of a vehicle is provided. The door operating system comprises an on-board device which is mountable on the vehicle and a mobile device. The on-board device comprises a door opening mechanism, a door control module for activating the door opening mechanism, a door opening sensor configured to receive a door opening signal for bringing the door control module into an automatic opening mode, and a presence sensor. The presence sensor is configured to detect a presence signal from a wireless vehicle access device. The mobile device comprises a transmitter for sending the door opening signal to the door opening sensor, a transaction module for cashless purchasing of goods and for providing transaction data indicative of at least one physical parameter of the purchased goods, and a processor. The processor is configured to activate the transmitter for sending out the door opening signal to the door opening sensor if at least one door opening criterion based on the physical parameters of the goods purchased after the user has left the vehicle is fulfilled. The boot door control module is configured such that, while being in the automatic opening mode, it can activate the door opening mechanism once the presence signal from the wireless vehicle access device is detected.

By receiving the door opening signal from the transmitter of the mobile device and by bringing the door control module into the standby mode, the door of the vehicle boot can be swiftly opened once the presence signal is detected. Thus, the waiting time of the user until the boot door opens, can be minimized.

According to still another embodiment of the application a method for automatic opening of a door of a vehicle boot by means of a mobile device is provided. The method comprises:

tracking a transaction information, the transaction information being related to goods purchased by the user of a mobile device since the user last time left the vehicle,
tracking a location information of the mobile de-vice,
determining based on the location information whether the user is within a predefined door opening distance from the boot of the vehicle,
determining based on the transaction information whether a threshold value of at least one door opening criterion based on the transaction information is fulfilled, and
sending a door opening signal to a door opening sensor, the door opening sensor being configured to activate bring a boot door control module of the vehicle into an automatic opening mode, if determined that at least one door opening criterion is fulfilled.

By sending the door opening signal to the door opening sensor of the vehicle boot door control module if determined that the at least one door opening criterion is fulfilled, the door of the vehicle boot can be brought into the automatic opening mode, also referred as open-standby mode or standby mode below, for a swift opening of the door once the user is in the predefined distance from the boot. In this way, the user who is carrying the purchased goods does not need to search for the key or wait until the remote keyless control activates the door opening mechanism of the door of the vehicle boot. Instead, the user, in particular the driver of the vehicle, can seamlessly stow the purchased goods in the boot of the vehicle without suffering any inconvenience by waiting at the closed vehicle boot door.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION OF THE PREFERRED EMBODIMENTS

In the following description, details are provided to describe embodiments of the application. It shall be apparent to one skilled in the art, however, that the embodiments may be practiced without such details.

Some parts of the exemplary embodiment have similar parts. The similar parts may have the same names or similar part numbers. The description of one similar part also applies by reference to another similar parts, where appropriate, thereby reducing repetition of text without limiting the disclosure.

Figure 1:
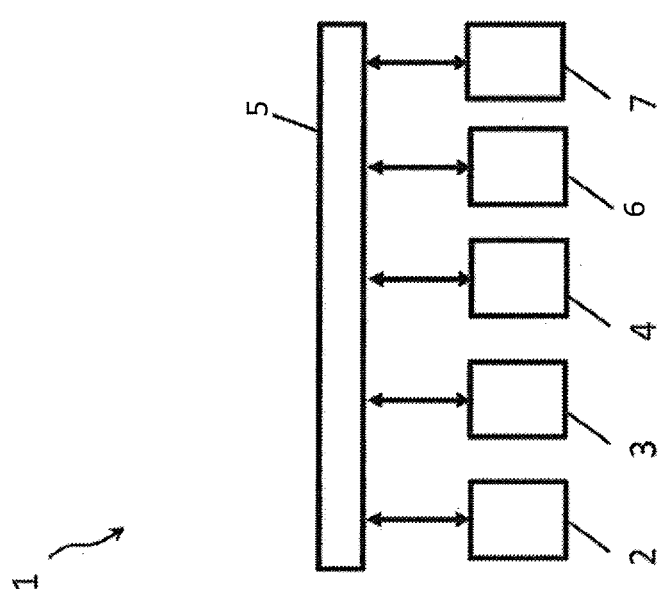
FIG. 1 shows schematically a mobile device for automatic opening of a door of a vehicle boot according to an exemplary embodiment.

FIG. 1 shows schematically a mobile device for automatic opening of a door of a boot of a vehicle according to an exemplary embodiment.

The mobile device 1, which can be also referred to as smart device or smart mobile device, comprises a processor 2, transmitter 3, and a transaction module 4. The processor 2, transmitter 3, and the transaction module 4 are coupled with each other via a system bus 5.

The mobile device is further equipped with a location module 6 and with a memory 7. The location module 6, which is a GPS module in this embodiment, and the memory 7 are also connected with the system bus 5.

The memory 7 can comprise a system memory for storing system-relevant data and a random access memory (RAM) for storing current computational data.

The mobile device 1 can also comprise a storage device which can be a hard disk drive, a flash memory card drive, an optical disk drive, or similar. The storage device can carry software to control the processor 2.

The transmitter 3 is a short range radio transmitter configured to send a door opening signal to a door opening sensor of a boot control module of the vehicle.

The transaction module 4 is configured to carry out cashless purchasing. In particular, the transaction module 4 is equipped with an NFC (Near Field Communication) interface with an NFC transceiver and is configured to make cashless transactions by means of the NFC interface, such as payments for good and services. The NFC transceiver can send an encrypted user credit card identifier data and can receive transaction data, from which data about at least one physical parameter of the purchased goods can be derived. The encrypted user credit card identifier data, the transaction data, as well as the data about the physical parameters of the goods can be stored in the memory 7.

The physical parameters of the purchased goods can be in particular derived from the specifications of the goods which might be also stored in the memory 6, and can be assigned to the purchased goods based on the identification numbers or the identifications codes of the purchased goods, which can be transmitted to the transaction module from a POS terminal or captured by a camera, which can also be part of the mobile device, while carrying out a purchasing. In an embodiment, the specifications of the goods can be downloaded from the cloud prior to storing in the memory 6.

The processor is configured to determine based on the transaction data whether at least one door opening criterion related to the at least one physical parameter of the purchased goods is fulfilled by the goods purchased after the user left the vehicle and to activate the transmitter 3 for sending out the door opening signal to the door opening sensor if the at least one door opening criterion is fulfilled and if the user is within predefined distance from the boot.

The door opening criterion can be related with the length, width, height and weight of the purchased goods. The door opening criterion can also be related with the total number of transactions.

In an embodiment the mobile device 1 can include multiple processors. By using multiple processors the computation process can be speeded in order to avoid delay in the opening of the door of the vehicle boot.

The mobile device 1 can also comprise a high speed cache memory directly connected to or integrated into the processer 2.

For quick processing, the data provided in the memory 6 is copied in to the cache of the processor 2. Because of shorter time needed for the processor 2 to access the data in the cache memory, this will boost up the calculating performance of the mobile device 1.

In an embodiment, the mobile device 1 further comprises a receiver for receiving a signal from a transmitter mounted on the vehicle, in particular at the boot of the vehicle. The received signal can be used for determining that a wireless connection between the remote keyless system of the vehicle and the mobile device has been established. The processor can be configured to determine that the user left the vehicle if the wireless connection is lost and to determine that the user is within the predefined distance from the boot if the wireless connection is re-established.

In operation, when the mobile device is on and is carried by the user, in particular by the driver of the vehicle, cashless purchasing can be carried out by the transaction module 4 and the transaction information can be recorded in the memory 7 of the mobile device 1. The transaction information can be recorded as data which can be processed by the processor 2 in order to evaluate the need to trigger the vehicle boot opening operation.

Each purchase could be done without using money in cash or physical credit card and it is completed through the credit card information stored in the memory 7 of the mobile.

Once the driver leaves his vehicle, the smart device tracks and records his geographical location via the GPS location. The smart device then initiates a new transaction record list. The transaction record list contains all purchases made by the driver. Once a purchase transaction is completed, its transaction information is recorded in the memory 7 of the mobile device 1.

The transaction information of a purchase can include transaction type information, in particular, whether the transaction was related to goods or services. The transaction information includes also goods information or information about the goods purchased by the transaction. The goods information can be for example length, width, height, and/or weight of the purchased goods.

The data representing this transaction information is stored in the memory 7 and can be processed by the processor 2 in order to analyse the amount and size of the purchased goods.

In an embodiment, two purchased goods limits are set: the size of the purchased goods, and the amount of purchased goods.

Once any of these purchased limits is exceeded, the transmitter 3 of the mobile device 1 determines to open the vehicle boot by sending a signal to the door opening sensor for bringing a boot door control module of the vehicle in an automatic opening mode. While being in the automatic opening mode, the boot door control module can activate a door opening once the driver is in a predefined distance from the vehicle boot, which can be a distance between 1 and 5 meters.

For a better illustration of the method of the application, several case scenarios are considered below.

In a first scenario, the size of the purchased goods is small and none of the purchased goods limits is exceeded. In this case, it is not required to stow the purchased goods in the vehicle boot. The vehicle boot door opening signal is not sent to the vehicle and the vehicle boot would not open automatically, unless it is instructed specifically, for example, by standing beside the vehicle boot for some seconds or by activating the opening mechanism through remote control of the vehicle key.

In a second scenario, when for instance the driver purchases a crate of oranges, the size limit of the purchased goods is exceeded. In this case the goods require stowing in the vehicle boot and a signal is sent to the vehicle to activate the vehicle boot opening.

In a third scenario, the driver purchases several small items. In this scenario, the number of purchases is recorded and accumulated. When the second predetermined purchased goods limit—related to the quantity of the purchased goods—is exceeded, a signal is sent to the vehicle to activate the automatic opening mode.

In a fourth scenario, the driver purchases a combination of many small items and a number of large items, like a crate of oranges for instance. In this case, both predetermined purchased goods limits are exceeded and a signal is sent to vehicle to activate the automatic opening mode.

The transaction information can also include transaction type which shows what type of transaction has taken place, in particular, whether the transaction was a goods transaction, i.e. transaction related to purchasing goods, or a service transaction, i.e. transaction related to paying for services.

A service transaction can be excluded from being taken into account for purchase limit evaluations. For instance, a transaction which has taken place in a restaurant or in a hair salon will not be taken into account for evaluating the need to trigger the vehicle boot opening. On the other hand, if the transaction is completed in grocery stall, then the transaction is related to a goods purchase and it will be taken into account for evaluating the need to activate the automatic opening mode.

In an embodiment, if the transaction type is not available, the location module 6 within the mobile device 1 can be used to check the location of the transaction to enhance the accuracy of the evaluation of the need to trigger the vehicle opening by taking into account the known points of sale (POS) at the location where the specific transaction has taken place.

In an embodiment, a delivery type of the purchased goods can also be recorded and evaluated. For instance, if the driver purchases a television set and arranges for a home delivery by the store, this purchase is recorded but is not taken into account for purchase goods limit evaluations.

Figure 2:
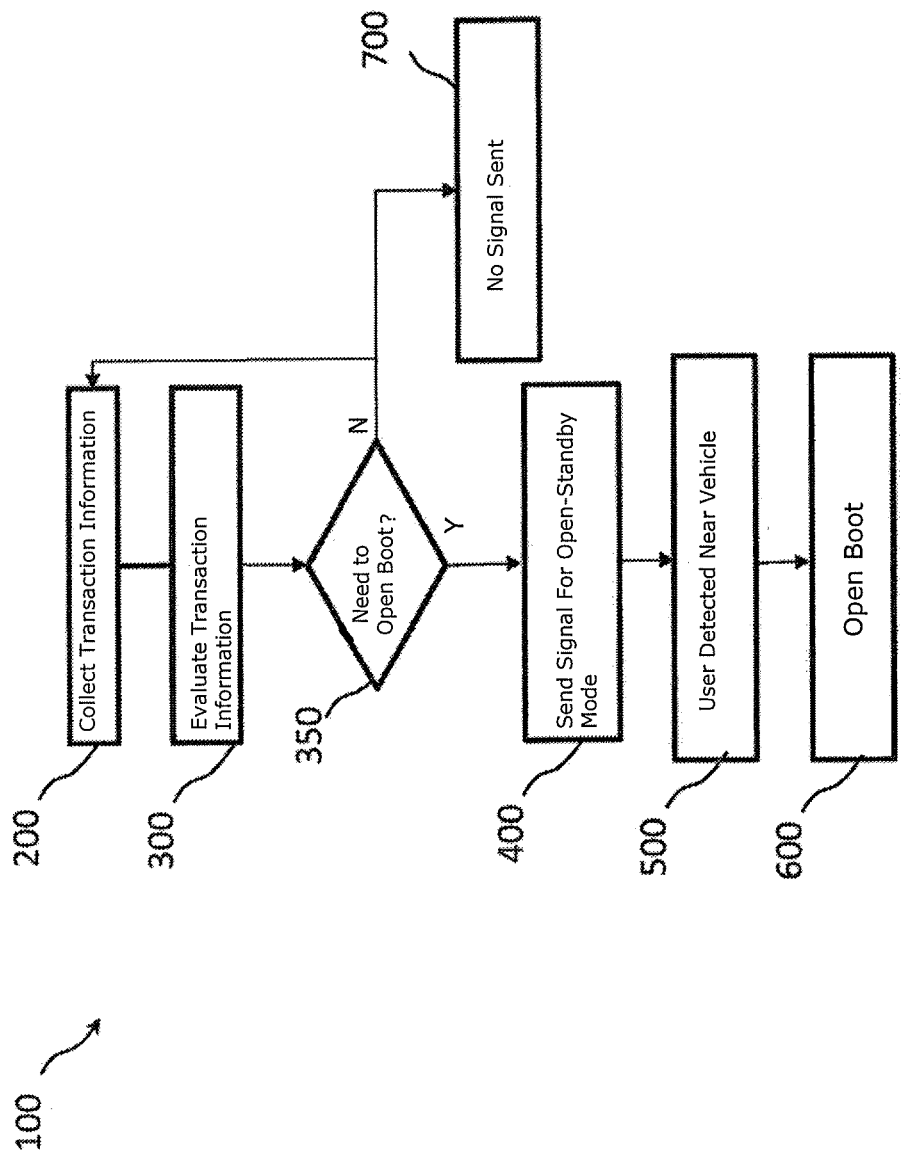
FIG. 2 shows a flow chart illustrating a method according to an exemplary embodiment.

FIG. 2 shows a flow chart 100 illustrating the method according to an embodiment.

The flow chart shows steps after a new transaction record list is started when the driver leaves his vehicle.

In step 200 of the flow chart, a transaction is carried out. In this process step, the information including type of transaction and goods information is collected and recorded.

In step 300, the transaction information is evaluated in order to determine in step 350 whether an automatic activation of the vehicle boot opening mechanism is necessary.

If it is determined in step 350 that the processed result indicates that the vehicle boot needs to be opened, in step 400 the mobile device will send signal to the vehicle for bringing the vehicle boot into the open-standby mode. After that, if the user nears the vehicle within a predetermined distance, which can lie between 1 meter and 5 meters, the vehicle boot opens as shown in steps 500 and 600.

If, on the other hand, it is determined in step 350 that none of the purchase goods limits is exceeded, the mobile device does not send signal to the vehicle for bringing the vehicle boot into the open-standby mode, as indicated by step 700 in the flow chart of FIG. 2. For a next transaction, the steps starting with the step 200 are repeated as described above.

The transaction record list is closed after all purchases have been made. The mobile device recognizes the transaction record list closure when the driver nears his vehicle using the information from the GPS in the mobile device based on his actual geographical location.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 mobile device
2 processor
3 transmitter
4 transaction module
5 bus
6 location module
7 memory
100 flow chart
200 completing transaction
300 processing transaction data
350 determining whether a limit exceeded
400 sending door opening signal
500 nearing the vehicle
600 opening boot door
700 no door opening signal

The invention claimed is:

1. A mobile device for automatic opening of a door of a vehicle boot, the mobile device comprising:
   a transmitter which sends a door opening signal to a door opening sensor of a boot door control module of the vehicle to bring the boot door control module into an automatic opening mode,
   a transaction module with a transceiver which sends a user credit card identifier data to cashlessly purchase goods and which receives corresponding transaction data with at least one physical parameter of the purchased goods,
   a memory module which stores the user credit card identifier data and the transaction data, and
   a processor which evaluates the transaction data and activates the transmitter to send the door opening signal once at least one door opening criterion based on the at least one physical parameter of the purchased goods is fulfilled.

2. The mobile device of claim 1, wherein mobile device is a hand-held mobile device or a wearable mobile device.

3. The mobile device of claim 1, wherein the transaction module comprises an NFC transceiver to cashlessly purchase goods with the mobile device.

4. The mobile device of claim 1, wherein the at least one physical parameter of the purchased goods comprises length, width, height, weight and/or quantity of the purchased goods.

5. The mobile device of claim 1, wherein the door opening criterion is fulfilled when a predefined limit in size or in weight of the purchased goods is exceeded.

6. The mobile device of claim 5, wherein the door opening criterion is fulfilled when a predefined limit in quantity of the purchased goods is also exceeded.

7. The mobile device of claim 1, wherein the mobile device comprises a location module which provides location data and the processor processes the location data to track the geographical location of the mobile device.

8. The mobile device of claim 1, wherein transaction data comprises at least one identification number or identification code of the purchased goods, and wherein the at least one physical parameter is a physical parameter stored in the memory module in association with the at least one identification number or identification code.

9. A door operating system for automatic opening of a door of a vehicle boot, the door operating system comprising an on-board device mountable on the vehicle and a mobile device,
   the on-board device comprising:
   a door opening mechanism, a boot door control module that activates the door opening mechanism, a door opening sensor that receives a door opening signal which brings the boot door control module into an automatic opening mode, a presence sensor that detects a presence signal from a wireless vehicle access device, the mobile device comprising:

a transmitter which sends the door opening signal to the door opening sensor, a transaction module which cashlessly purchases goods and provides transaction data indicative of at least one physical parameter of the purchased goods, and a processor which activates the transmitter to send out the door opening signal to the door opening sensor once at least one door opening criterion based on the physical parameters of the goods purchased after the user has left the vehicle is fulfilled, wherein the boot door control module, while being in the automatic opening mode, activates the door opening mechanism when the presence of the wireless vehicle access device is detected.

10. The door operating system of claim 9, wherein the mobile device is a hand-held mobile device or a wearable mobile device.

11. The door operating system of claim 9, wherein the transaction module comprises an NFC transceiver to cashlessly purchase goods with the mobile device.

12. The door operating system of claim 9, wherein the at least one physical parameter of the purchased goods comprises length, width, height, weight and/or quantity of the purchased goods.

13. The door operating system of claim 9, wherein the door opening criterion is fulfilled when a predefined limit in size or in weight of the purchased goods is exceeded.

14. The door operating system of claim 13, wherein the door opening criterion is fulfilled when a predefined limit in quantity of the purchased goods is also exceeded.

15. The door operating system of claim 9, wherein transaction data comprises at least one identification number or identification code of the purchased goods, and wherein the at least one physical parameter is a physical parameter stored in the memory module in association with the at least one identification number or identification code.

16. A method for automatic opening of a door of a vehicle boot by means of a mobile device, the method comprising:

tracking a transaction information from a transaction module comprised in the mobile device, wherein the transaction module sends a user credit card identifier data to cashlessly purchase goods and to receive corresponding transaction information, the transaction information being related to goods purchased by the user of the mobile device since the user last time left the vehicle, determining based on the transaction information whether a limit value of at least one door opening parameter based on the transaction information is fulfilled, and sending a door opening signal to a door opening sensor which brings a boot door control module of the vehicle into an automatic opening mode, once it is determined that at least one door opening criterion is fulfilled, and the boot door control module, while in the automatic opening mode, activates a door opening mechanism of the vehicle when presence of a wireless vehicle access device is detected.

17. The method of claim 16, wherein the transaction information comprises information about length, width, height, weight and/or quantity of the purchased goods.

18. The method of claim 17, wherein the door opening criterion is fulfilled when a predefined limit in size or in weight of the purchased goods is exceeded.

19. The method of claim 18, wherein the door opening criterion is fulfilled when a predefined limit in quantity of the purchased goods is also exceeded.

20. The method of claim 16, wherein transaction data comprises at least one identification number or identification code of the purchased goods, and wherein the at least one physical parameter is a physical parameter stored in the memory module in association with the at least one identification number or identification code.

* * * * *